(12) United States Patent
Kraft

(10) Patent No.: US 11,053,851 B2
(45) Date of Patent: Jul. 6, 2021

(54) SUPPLEMENTARY AIR INJECTION SYSTEM FOR GAS TURBINES

(71) Applicant: PowerPHASE LLC, Jupiter, FL (US)

(72) Inventor: Robert J. Kraft, Tequesta, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 383 days.

(21) Appl. No.: 15/430,138

(22) Filed: Feb. 10, 2017

(65) Prior Publication Data

US 2017/0234223 A1 Aug. 17, 2017

Related U.S. Application Data

(60) Provisional application No. 62/293,894, filed on Feb. 11, 2016.

(51) Int. Cl.
| | | |
|---|---|---|
| *F02C 7/18* | (2006.01) | |
| *F02C 7/08* | (2006.01) | |
| *F02C 5/06* | (2006.01) | |
| *F02C 6/08* | (2006.01) | |

(52) U.S. Cl.
CPC ............... *F02C 7/185* (2013.01); *F02C 7/08* (2013.01); *F02C 5/06* (2013.01); *F02C 6/08* (2013.01); *F05D 2260/211* (2013.01); *F05D 2260/232* (2013.01); *F05D 2270/3062* (2013.01)

(58) Field of Classification Search
CPC .... F02C 3/305; F02C 9/18; F02C 7/08; F02C 5/06; F02C 7/143; F02C 7/12; F02C 7/14; F02C 7/141; F02C 7/18; F02C 1/04; F02C 1/05; F02C 3/32; F01D 11/24; F05D 2260/205
USPC .......................................................... 60/726
See application file for complete search history.

(56) References Cited

U.S. PATENT DOCUMENTS

| | | | | |
|---|---|---|---|---|
| 5,680,752 | A * | 10/1997 | Skog ...................... | F02C 3/107 60/726 |
| 6,389,793 | B1 * | 5/2002 | Priestley ................ | F01D 25/12 60/782 |
| 8,459,039 | B2 * | 6/2013 | Allam .................... | F01K 23/10 60/785 |
| 9,260,974 | B2 * | 2/2016 | Hasting .................. | F01D 11/24 |
| 2011/0138818 | A1 * | 6/2011 | Mizukami .............. | F01D 11/24 60/778 |
| 2011/0181050 | A1 * | 7/2011 | Dinu ....................... | F02C 3/13 290/1 R |

FOREIGN PATENT DOCUMENTS

| | | | | |
|---|---|---|---|---|
| WO | WO-2013116185 | A1 * | 8/2013 | .............. F02C 6/18 |
| WO | WO-2014066276 | A2 * | 5/2014 | .............. F02C 7/22 |

* cited by examiner

*Primary Examiner* — Craig Kim
*Assistant Examiner* — Stephanie Sebasco Cheng
(74) *Attorney, Agent, or Firm* — Avant Law Group, LLC

(57) ABSTRACT

The present invention discloses embodiments for a power augmentation system of a gas turbine engine resulting in performance improvements while also improving efficiency. The invention provides systems and methods for generating a heated air supply by way of mixing compressed air from an electrically-driven process with air drawn from the engine compressor discharge plenum.

10 Claims, 4 Drawing Sheets

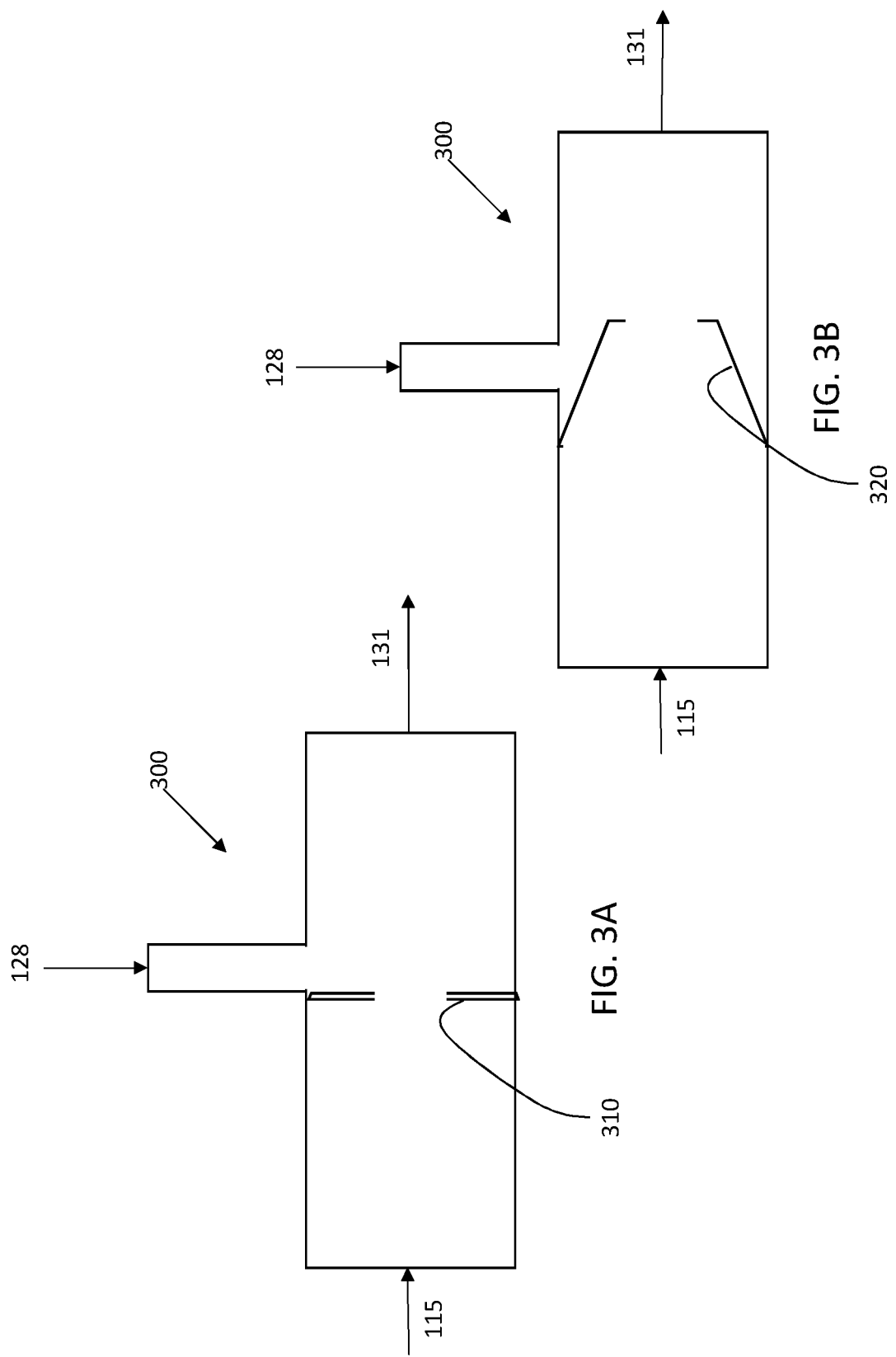

US 11,053,851 B2

SUPPLEMENTARY AIR INJECTION SYSTEM FOR GAS TURBINES

CROSS-REFERENCE TO RELATED APPLICATIONS

This application claims priority to U.S. Provisional Patent Application Ser. No. 62/293,894 filed on Feb. 11, 2016, which is hereby incorporated by reference in its entirety.

TECHNICAL FIELD

This invention relates generally to electrical power systems, including generating capacity of a gas turbine engine, and more specifically to improving the efficiency and power output of the gas turbine engine by using an electrically driven air injection system.

BACKGROUND OF THE INVENTION

Air compression systems are known as a way of providing power augmentation to gas turbine engines. One such process utilizes an auxiliary air compression process separate from the gas turbine engine. However, in certain locations it is not possible or desirable to use a separate engine to power and heat the auxiliary air compression process.

Due to permitting restrictions in certain regions, it may be necessary to have an electric driven system for powering the air compression process. However, the electric driven system does not provide a way to heat the air prior to injection. Typically, air being injected into the gas turbine engine is required to be at least approximately 500 deg. F., such that when the air is injected into the gas turbine engine, the potential for thermal cracking and combustion instabilities is eliminated.

For example, one such compressor used in an auxiliary air compression process is a multistage intercooled compressor, which typically has a compressed air exit temperature of about 220 deg. F. At this temperature, there is a need to develop an alternate method to heat the air being injected to at least 500 deg. F. In prior art configurations, such as in U.S. Pat. No. 6,305,158, Nakhamkin teaches using waste heat from the exhaust of the gas turbine engine to heat up the air from an electrical driven air injection system; however, this has two serious drawbacks.

The first drawback of using the exhaust heat to raise the temperature of the compressed air is its effect on a combined cycle power plant, which are the most efficient types of plants generating the majority of energy on the grid. These plants offer the most attractive payback to potential customers having air injection systems because they operate more often than simple cycle gas turbine engines. In a combined cycle system, all of the waste heat is used in the steam bottoming cycle and, if some of the exhaust energy is to be used to heat the compressed air, then, the bottoming cycle loses power output and the overall efficiency of the system is negatively impacted.

The second drawback of using the exhaust heat from the gas turbine engine to heat the compressed air is that installation of a recuperator is not practical inside an existing heat recovery steam generator (HRSG). Adding a recuperator to this system would add a significant level of complexity and a permanent increase in exhaust pressure drop, independent of the system actually running, and therefore causing a permanent efficiency penalty whether the system is running or not.

Consequently, the only practical gas turbine engine from which to recover the exhaust energy is a simple cycle gas turbine engine. However, due to the low efficiency levels of a simple cycle gas turbine engine relative to combined cycle plants, simple cycle plants do not operate as frequently as combined cycle plants, making it difficult for customers to earn a reasonable return on their investment.

SUMMARY

The current invention provides several embodiments for power augmentation of a gas turbine engine, resulting in performance improvements and improved efficiency. The current invention provides a method of heating compressed air generated by a compressor for injection into a gas turbine by mixing compressed air from the gas turbine's compressor discharge plenum with compressed air from the separate compressor.

In an embodiment of the present invention, a method of operating a gas turbine energy system is provided. The method comprises operating a gas turbine engine having a compressor, a compressor discharge plenum, one or more combustors, and a turbine, all fluidly connected to each other, and operating an auxiliary air compression system comprising an intercooled compressor powered by an electric motor, where the intercooled compressor compresses ambient air to produce a primary air source at a first temperature. The method also directs a portion of air from the compressor discharge plenum through a blower pump so as to compress this air to a higher pressure and then mixes the primary air source and the air from the blower pump to produce a mixed compressed air at a temperature higher than the primary air source with the mixed compressed air being inject into the gas turbine engine.

In an alternate embodiment of the present invention, a gas turbine energy system is provided comprising a gas turbine engine having a compressor, a compressor discharge plenum, one or more combustors, and a turbine, fluidly connected to each other. The system also comprises an auxiliary air compression system having an intercooled compressor powered by an electric motor, a blower pump powered by an electric motor, the blower pump in fluid communication with the compressor discharge plenum, and a conduit system coupling the blower pump and the auxiliary air compression system to the compressor discharge plenum.

In yet another embodiment of the present invention, a method of operating a gas turbine energy system is provided. The method comprises operating a gas turbine system having a compressor, a compressor discharge plenum, one or more combustors, and a turbine, fluidly connected to each other and operating an intercooled compressor producing a primary air source at a temperature cooler than the compressor discharge plenum. The primary air source flows through a flow restriction device, creating a vacuum on an air supply of the compressor discharge plenum, causing the air supply to be drawn from the compressor discharge plenum. The intercooled primary air source and the air supply from the compressor discharge plenum are then mixed together, thereby producing a mixed compressed air at a temperature higher than the primary air source. The mixed compressed air is then returned to the gas turbine engine.

In another embodiment of the present invention, a gas turbine energy system is provided comprising a gas turbine engine having a compressor, a compressor discharge plenum, one or more combustors, and a turbine, fluidly connected to each other and an intercooled compressor producing a primary air source at a temperature cooler than the compressor discharge plenum. The system also includes a flow restriction device positioned within a flow of the primary air source, creating a vacuum effect on an air supply in the compressor discharge plenum. A conduit for mixing the intercooled primary air source and the air supply vacuumed from the compressor discharge plenum is also provided with the conduit coupled to the compressor discharge plenum and an outlet region of the intercooled compressor.

One aspect of the present invention relates to methods and systems where, for example, a multistage intercooled electrically driven compressor with pressurized air typically at a temperature of 220 deg. F. and pressure of 220 psi is mixed with air that is taken from the gas turbines compressor discharge plenum typically at 700-850 deg. F. and 215 psi. The air from the compressor discharge plenum is increased in pressure by a single stage blower to 220 psi, with the two streams then being joined together in approximately a 50/50 mass relationship, resulting in 500 to 550 deg. F air for injection into the gas turbine.

Another aspect of the present invention relates to methods and systems where a multistage intercooled electrically driven compressor producing, for example, pressurized air typically at a temperature of 220 deg. F. and 220 psi is mixed with air that is withdrawn from the gas turbine compressor discharge plenum, by a vacuum effect, typically at 700-850 deg. F. and 215 psi. The air is then pumped up in pressure by a single stage booster pump to 220 psi, and the two streams are joined together in approximately a 50/50 mass relationship, resulting in 500 to 550 deg. F air for injection into the gas turbine.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 3A depicts a metering plate device through which air from the compressor discharge plenum flows in accordance with FIG. 2.

FIG. 3B depicts a venturi through which air from the compressor discharge plenum flows in accordance with FIG. 2.

DETAILED DESCRIPTION

The present invention relates to gas turbine energy systems, and more specifically to ways of heating an auxiliary source of compressed air produced by an electric-driven compression system.

Figure 1:
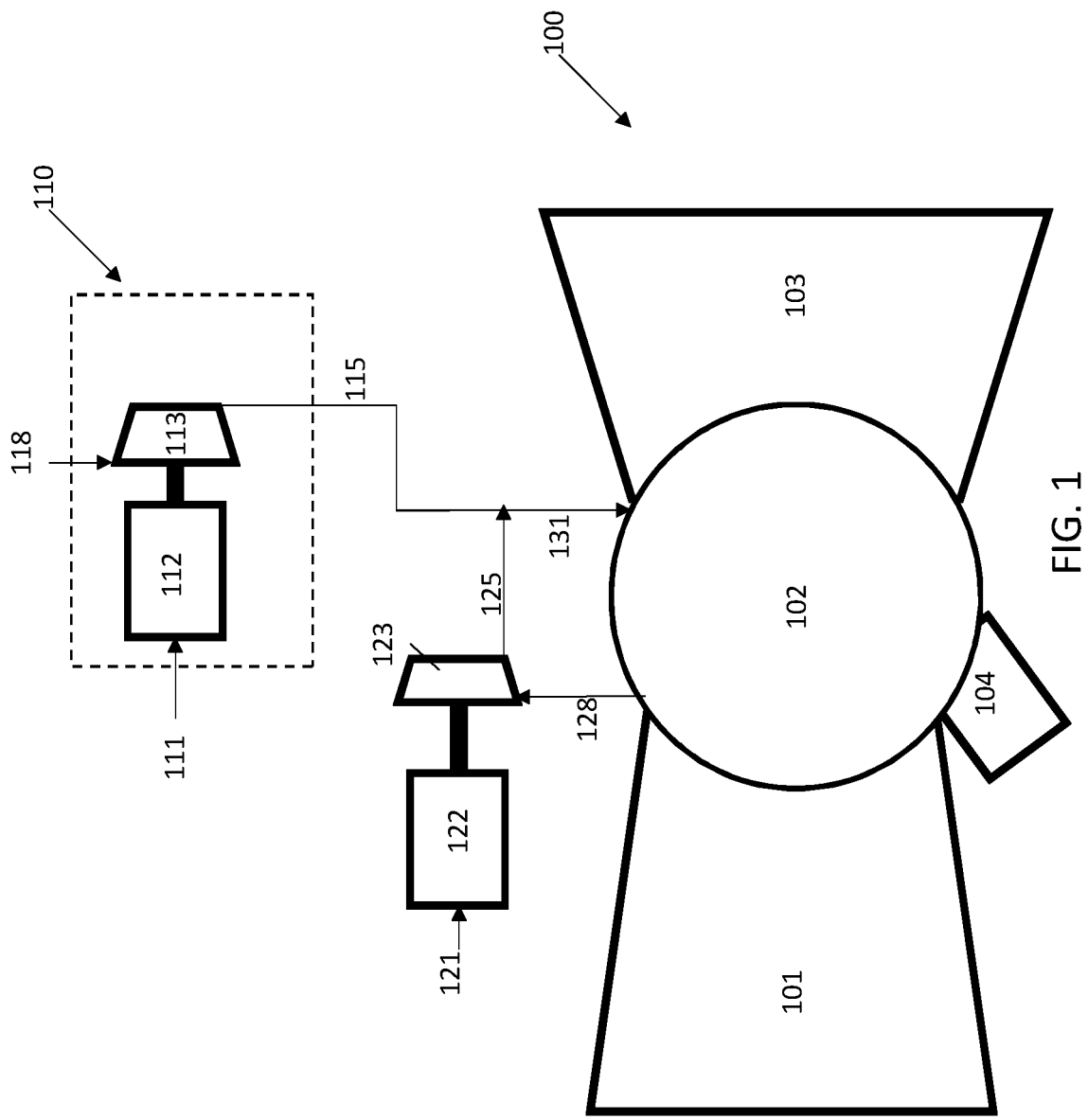
FIGS. 1 and 1A respectively depict a schematic drawing of an electric driven air injection system and a fuel driven air injection system, each including a blower pump used to pull air from the compressor discharge plenum of the gas turbine engine.

Referring initially to FIG. 1, a gas turbine energy system is provided comprising a gas turbine engine 100 having a compressor 101, a compressor discharge plenum 102, one or more combustors 104, and a turbine 103, all in fluid communication. More specifically, ambient air is drawn into the engine compressor 101 and compressed to a higher pressure and temperature, typically about 750 deg. F. The compressed air flows out of the compressor 101 and into a compressor discharge plenum 102. The air is then directed to one or more combustors 104, where fuel is mixed with the air to form a combustible mixture and ignited to burn and generate hot combustion gases, which pass through, and rotate the turbine 103. The turbine 103 is coupled to the compressor 101 by a shaft (not shown) such that rotational energy from the turbine powers the compressor.

The present invention also comprises an auxiliary air compression system 110 having an intercooled compressor 113 powered by a motor 112. More specifically, electrical energy 111 is used to drive the motor 112, which provides power to the intercooled compressor 113. Ambient air 118 is drawn in to the intercooled compressor 113 and compressed, albeit at a lower temperature due to the cooling between stages of the intercooled compressor 113, resulting in a primary air source 115 of compressed air at approximately 220 deg. F. However, the ambient air 118 is compressed to a pressure higher than the pressure in the compressor discharge plenum 102.

A blower pump 123 is powered by a motor 122, which consumes electrical energy 121 and extracts compressed air 128 from the compressor discharge case 102 prior to the air entering the combustors 104. This compressed air 128 is typically about 750 deg. F. The blower pump 123 takes in the compressed air 128, increases its pressure, and discharges it such that the primary air source 115 and the hot air 125 coming from the blower 123 join together in a conduit system 131 to create a mixed compressed air having a higher temperature than the primary air source 115. Typically, air injected in this region should be about 500 deg. F. or higher in order to prevent the possibility of thermal cracking and combustion instability. That is, by utilizing a portion of the compressed air 128 from the compressor discharge plenum 102, and further increasing its pressure, it can be mixed with cooler compressed air generated by the motor 112 and compressor 113 external to the gas turbine engine 100 at approximately 50/50 quantities of air from each source, and returned to the engine 100 at a suitable temperature and pressure level to provide power augmentation. This can be accomplished without having any adverse effects of using the gas turbine waste heat or negative effects on the bottoming cycle in combined cycle plants.

Figure 2:
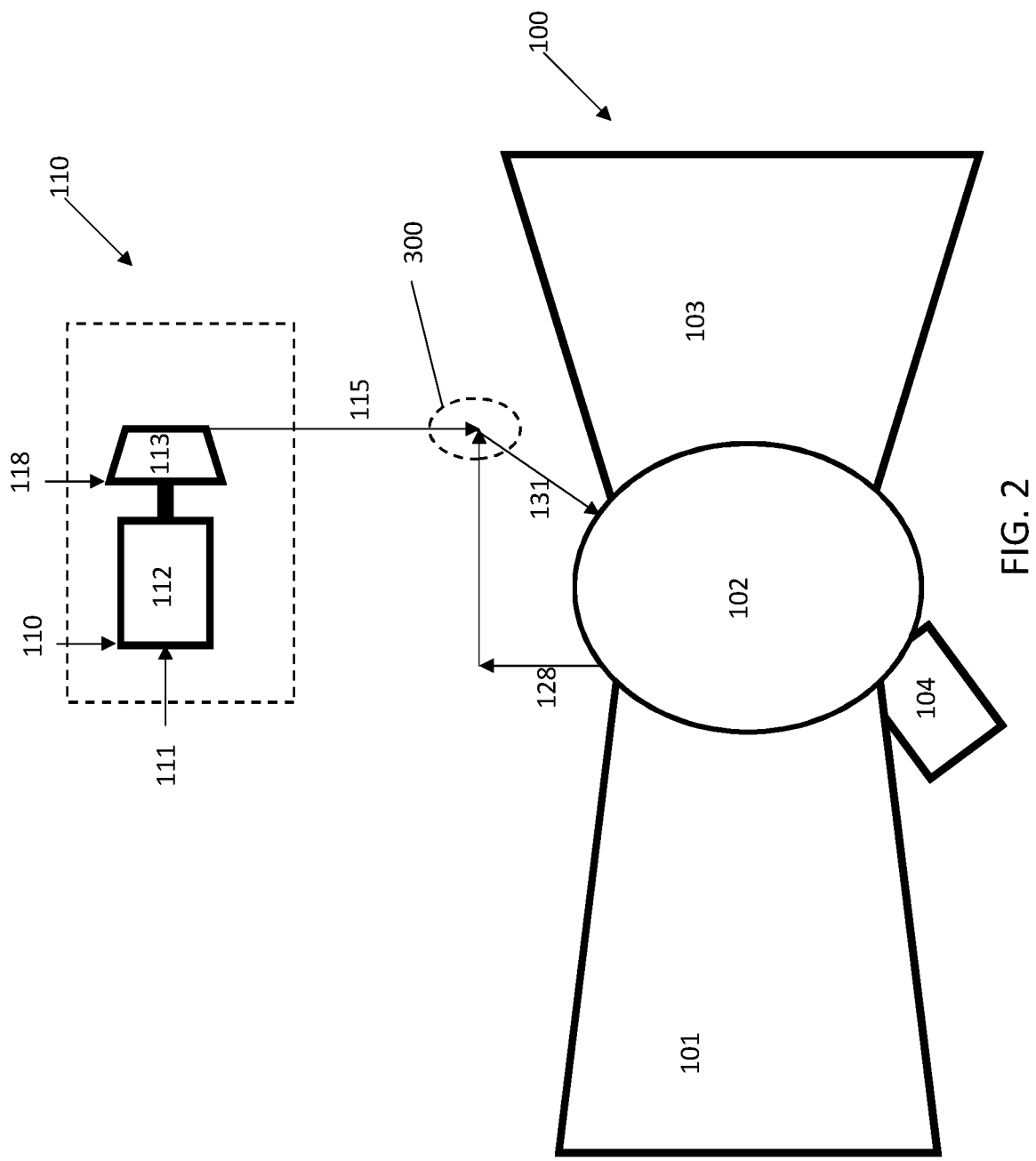
FIG. 2 depicts a schematic drawing of an electric driven air injection system having a device is used to pull air from the gas turbine's compressor discharge plenum where the air is added to the relatively cool air coming from the electric driven air injection system.

Referring now to FIG. 2, an alternate embodiment of the present invention is disclosed. In this alternate embodiment, similar results to that of the system of FIG. 1 are achieved, but with a different structure and process. The alternate embodiment utilizes the features of the gas turbine engine 100 and auxiliary air compression system 110 discussed above. However, this embodiment of the present invention utilizes a flow restriction device 300, as shown in FIGS. 3A and 3B, to create a local low pressure zone, or vacuum, which extracts hot compressed air 128, typically about 750 deg. F., from the compressor discharge plenum 102 prior to the air going to the combustion system. The primary air source 115 generated by the intercooled compressor 113 and compressed air 128 drawn from the compressor discharge plenum 102 come together to create a mixed compressed air in a conduit 131 prior to being injected into the gas turbine engine 100. Typically, the air being injected into the gas turbine engine 100 must be at least 500 deg. F., and the flow restriction device 300 serves to mix the air from the gas turbine engine 100 in approximately 50/50 relationship with the primary air source 115 from the intercooled compressor 113. This is accomplished without having any adverse effects of using the gas turbine waste heat, which can have negative effects on the bottoming cycle in combined cycle plants.

Referring now to FIGS. 3A and 3B, more specific details of the flow restriction device 300 are depicted. The flow restriction device 300 creates a pressure drop, and as a result, a corresponding vacuum effect that pulls in compressed air 128 from the compressor discharge plenum 102. Examples of acceptable flow restriction devices include an orifice plate 310, as shown in FIG. 3A and a venturi 320, as shown in FIG. 3B. The vacuum device 300 can be a device positioned inside or adjacent to the gas turbine engine 100, or alternatively, it can be a device positioned outside the gas turbine engine 100, as depicted in FIG. 2, where all the primary air source 115 and the compressed air 128 are mixed outside the gas turbine engine 100 and then injected back into the engine. For example, on a General Electric Frame 7FA gas turbine engine, there is an inlet bleed heat (IBH) manifold that extracts air from four ports approximately evenly spaced around the gas turbine engine. The present invention can be incorporated into this engine by way of a second manifold that is added to the system and spaced axially aft of the existing IBH manifold and could then include four pipes coming from the IBH manifold, each one supplying the vacuum side of an orifice style or venturi style device, 310 or 320, with the four mixed compressed air streams being individually injected back into the gas turbine engine compressor discharge case through a set of four different ports. Alternatively, the four mixed compressed air streams could be joined into one pipe and injected back into the gas turbine compressor discharge plenum at a single location.

Figure 1A:
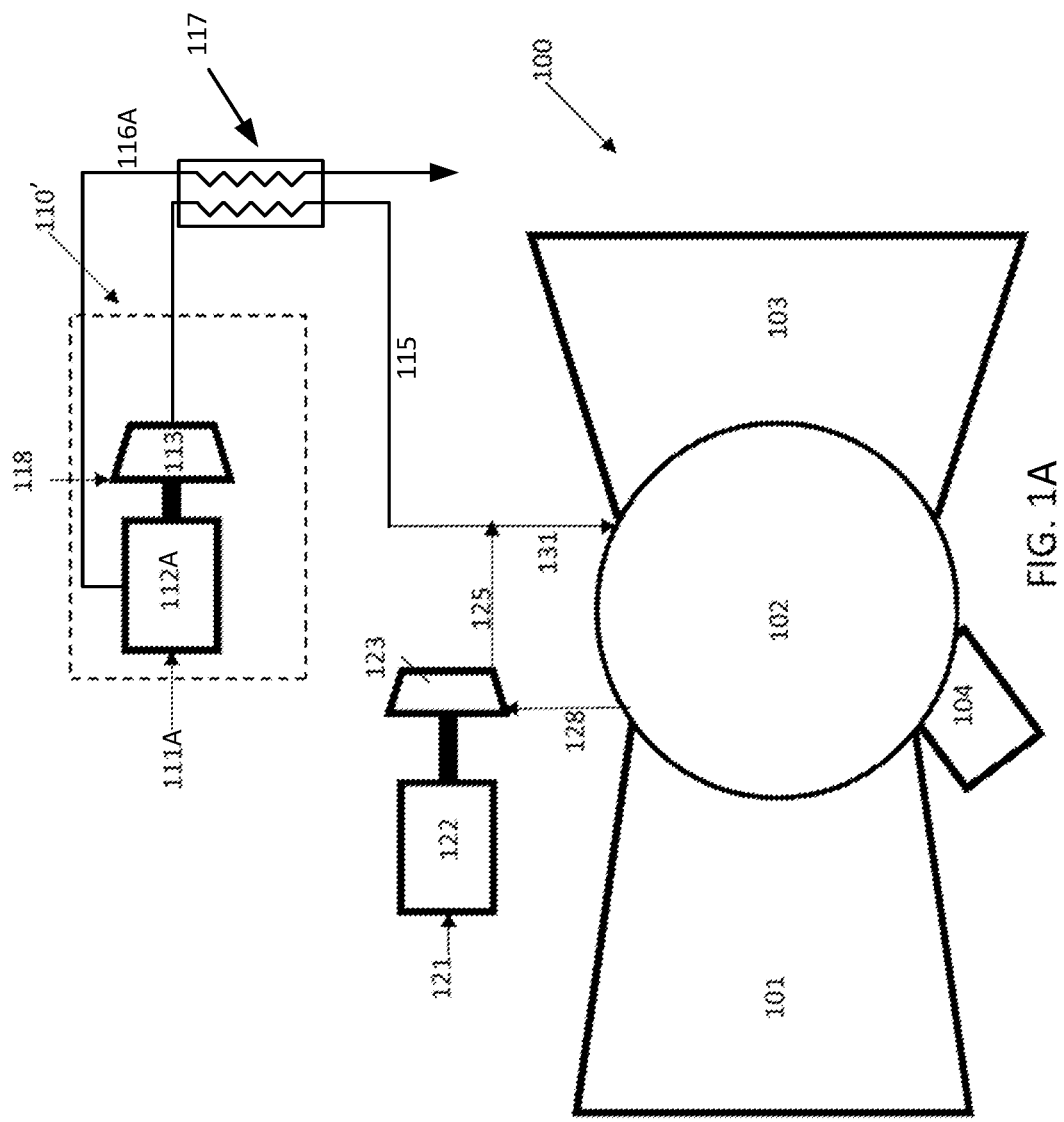

As one skilled in the art can appreciate, the temperatures and pressures mentioned above are typical values of "F-class" gas turbines. However, the same principles discussed herein will apply to other gas turbine engines. For example, if an air injection system as discussed herein is installed on a much higher pressure ratio gas turbine, such as an aero derivative engine, a similar configuration can be used to increase the injection air temperature of the primary air source 115 that was already heated with another heat source, such as exhaust 116A of an engine 112A (a reciprocating engine driven by fuel 111A) associated with an air injection system 110' as shown in FIG. 1A. For instance, as shown in FIG. 1A, the temperature of the primary air source 115 may be increased by running the primary air 115 through a heat exchanger 117 with the exhaust air 116A. For example, an LM6000 aero derivative engine produced by General Electric Company has a much higher pressure ratio with compressor discharge plenum temperatures approaching 1000 deg. F. An auxiliary air injection system, such as that produced by PowerPHASE LLC, the assignee of the present invention, generates hot compressed air with a fuel driven system at approximately 650 deg. F., and therefore, the compressor discharge case air of the aero derivative engine could be mixed with the air from the auxiliary air injection system to produce an air supply closer to the temperature of the air in the compressor discharge case.

In an alternate embodiment of the present invention, the mixed compressed air in conduit 131 can be used for cooling one or more turbine components, instead of for power augmentation. As one skilled in the art understands, turbine components often operate above their material capability, but are actively and aggressively cooled in order to lower their effective operating temperatures. The mixed compressed air can be injected back into the gas turbine engine 100 and directed through pre-existing cooling channels or actively cooling turbine components such as turbine blades and vanes.

Accordingly, the claims below are directed to both systems and methods capable heating injected air without the limitation of whether the primary air source is generated using a fueled engine with a recuperator or an electrically driven system, which inherently produces much cooler compressed air.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of operating a gas turbine energy system comprising:
   operating a gas turbine engine comprising a compressor, a compressor discharge plenum, one or more combustors, and a turbine, fluidly connected to each other;
   operating an auxiliary air compression system comprising an intercooled compressor and a reciprocating engine, where the intercooled compressor compresses ambient air producing an air source;
   heating the air source with exhaust from the reciprocating engine to form a primary air source at a first temperature;
   directing a portion of air from the compressor discharge plenum through a blower pump thereby compressing the air from the compressor discharge plenum to a higher pressure;
   mixing the primary air source and the air from the blower pump to produce a mixed compressed air having a temperature higher than the first temperature of the primary air source; and,
   injecting the mixed compressed air into the gas turbine engine.

2. The method of claim 1, wherein the primary air source has a temperature cooler than air in the gas turbine compressor discharge plenum.

3. The method of claim 1, wherein the blower pump is powered by an electric motor.

4. The method of claim 1, wherein the mixed compressed air is used to cool a component of the turbine.

5. The method of claim 1, wherein the mixed compressed air is injected into the compressor discharge plenum for power augmentation of the gas turbine energy system.

6. A method of operating a gas turbine energy system comprising:
   operating a gas turbine engine comprising a compressor, a compressor discharge plenum, one or more combustors, and a turbine, fluidly connected to each other;

operating an auxiliary air compression system comprising an intercooled compressor and a reciprocating engine, where the intercooled compressor compresses ambient air producing an air source;

heating the air source with exhaust from the reciprocating engine to form a primary air source at a first temperature;

directing a portion of air from the gas turbine engine upstream of the combustors through a blower pump thereby compressing the air from the gas turbine engine to a higher pressure;

mixing the primary air source and the air from the blower pump to produce a mixed compressed air having a temperature higher than the first temperature of the primary air source; and, injecting the mixed compressed air into the gas turbine engine.

7. The method of claim 6, wherein the primary air source has a temperature cooler than the air from the gas turbine engine.

8. The method of claim 6, wherein the blower pump is powered by an electric motor.

9. The method of claim 6, wherein the mixed compressed air is used to cool a turbine blade.

10. The method of claim 6, wherein the mixed compressed air is injected into the compressor discharge plenum for power augmentation of the gas turbine energy system.

* * * * *